United States Patent [19]

Vobach

[11] Patent Number: 5,201,918

[45] Date of Patent: Apr. 13, 1993

[54] APPARATUS AND METHOD FOR THE CAPTURE AND STORAGE OF VOLATILE GASES

[76] Inventor: Arnold R. Vobach, 11114 Ashcroft, Houston, Tex. 77096

[21] Appl. No.: 665,039

[22] Filed: Mar. 4, 1991

[51] Int. Cl.⁵ .............................................. B01D 19/00
[52] U.S. Cl. .......................................... 55/43; 62/292; 62/77; 62/20; 55/55; 55/56; 55/57
[58] Field of Search ................... 62/292, 149, 77, 85, 62/20, 476, 483, 3.2, 3.3; 55/68, 80, 84, 88, 255, 256, 43, 56, 55, 57; 252/69

[56] References Cited

U.S. PATENT DOCUMENTS

| | | | |
|---|---|---|---|
| 2,225,990 | 12/1940 | Henry | 62/474 |
| 2,305,337 | 12/1942 | Allen et al. | 62/474 |
| 2,446,988 | 8/1948 | Flukes et al. | 62/483 |
| 2,510,737 | 6/1950 | Buffington | 62/475 |
| 2,979,923 | 4/1961 | Bury | 62/476 |
| 3,899,312 | 8/1975 | Kruis et al. | 62/20 |
| 4,862,699 | 9/1989 | Lounis | 62/149 |

OTHER PUBLICATIONS

Jordan et al., Refrigeration and Air Conditioning, 1948 pp. 337-343.

*Primary Examiner*—John Sollecito
*Attorney, Agent, or Firm*—Gunn, Lee & Miller

[57] ABSTRACT

The invention consists of a process for evacuating volatile gases from confined spaces (notably refrigerants from refrigerating machinery), dissolving them in polar solvents by compression, cooling or both, purifying them, storing them and releasing them from solution by decompression or heating or both.

1 Claim, 3 Drawing Sheets

APPARATUS AND METHOD FOR THE CAPTURE AND STORAGE OF VOLATILE GASES

FIELD OF THE INVENTION

The present invention relates generally to an apparatus and method for the capture and storage of volatile gases. Specifically, the present invention relates to an apparatus and method for the reclamation of refrigerant.

BACKGROUND OF THE INVENTION

The present need for reclamation and recycling of many traditional refrigerant gases, such as, for example, the CFC's in particular, is well established and known. Laws increasingly focus on prohibiting the release of many such environmentally damaging gases into the atmosphere. The most common current method of reclaiming refrigerant from inoperable refrigerating units is to extract the refrigerant by a compressor, condense it at high pressure and store it as a liquid. Water and acids can be filtered or removed during the process. The problem with this method is that as the vapor pressure decreases in the space to be evacuated, it rises in the condenser. This means that the compressor must function, at its inlet, like a vacuum pump and, at its outlet, like a compressor. The results are high power consumption and a decided slowing down of the operation toward the end (which means higher labor costs).

Patents related to the present invention are U.S. Pat. Nos. 4,707,996 (Vobach); 4,724,679 (Vobach); 4,719,767 (Reid, Jr., et al.); 4,742,687 (Reid, Jr., et al.); 4,742,693 (Reid, Jr., et al.); 4,784,783 (Erickson); and 4,813,342 (Scheider, et al.). U.S. Pat. Nos. 4,719,767; 4,742,687; 4,742,693 of Reid, Jr., et al. and 4,784,783 of Erickson all refer to thermally driven heating and cooling cycles unlike the mostly pressure driven process of the present invention. U.S. Pat. No. 4,813,342 of Schneider, et al. refers to compressor seals for cryogenic pumps, again irrelevant to the process of the present invention.

It is, therefore, a feature of the present invention to provide an apparatus and method for the capture and storage of volatile gases. A feature of the present invention is to provide an apparatus and method for the reclamation of refrigerant. Another feature of the present invention is to provide an apparatus and method for dissolving highly volatile gases into liquid solvents.

Another feature of the present invention is to provide an apparatus and method for use by service technicians to capture and store refrigerants during repair or prior to the destruction of refrigerators, air conditioners and heat pumps. The process and favored embodiments of the present invention are intended to meet that need and also to return reclaimed refrigerant to sufficient purity that it can be reused.

SUMMARY OF INVENTION

To achieve the foregoing objects, features, and advantages and in accordance with the purpose of the invention as embodied and broadly described herein, the method consists of dissolving highly volatile (commonly refrigerant) gases into liquid solvents notable for their absorptive capacity and low vapor pressures at operating conditions. Such gases will generally be referred to herein as refrigerants. Particularly, the present invention uses solvents specifically for capturing and storing refrigerants and also of the techniques for doing this efficiently, compactly and quickly.

The process of the present invention requires a region or zone of variable pressure or variable temperature or both. This zone will normally contain vapors of the refrigerant being captured and a quantity of a liquid solvent, of relatively low volatility and with respect to which the refrigerant vapor exhibits a negative deviation from Raoult's Law. Generally, the mass fraction of refrigerant in the liquid solution will be, at a given temperature, proportional to the pressure in the region of variable pressure and temperature and, for a given pressure, will be inversely proportional to the temperature. Because of the absorptive nature of the solvent relative to the refrigerant, operating pressures will generally be substantially lower than those of the conventional apparatus, as described above, and hence the last or "scavenging" phase of the gas capture will be quicker and less expensive. The region or zone of variable temperature and pressure may, for conceptualizing the process, be regarded as a thermally insulated pressure vessel with entrance and exit ports for the refrigerant and with means of raising or lowering either the interior pressure, the interior temperature or both. Preferably, a means of increasing and reducing the pressure of the refrigerant gas or a means of cooling and heating the refrigerant-solvent solution, or possibly both such means, are provided by the present invention.

Still further, the present invention may utilize means of filtering the refrigerant-solvent solution to remove impurities; means of removing vaporized solvent from the refrigerant vapor exiting the apparatus or encompassed in the process; means of removing noncondensable gases, and means of mixing the refrigerant gas and liquid solvent, as by agitation, stirring of the solution or the like.

Initially, the method of the present invention draws refrigerant from the unit or space to be evacuated by compressing the gaseous refrigerant and introducing the refrigerant at higher pressure into the zone of variable pressure and variable temperature (hereafter called the "ZVPVT"). Alternately, the method of the present invention draws refrigerant from the unit or space to be evacuated by reducing the pressure in the ZVPVT, relative to that of the space being evacuated, by cooling the liquid (solvent or refrigerant-solvent solution) in the ZVPVT. In the ZVPVT, the refrigerant is contacted with the solvent and dissolves into the solvent, releasing the heats of mixing and of condensation. Stirring, agitating or other means of mixing the gas and liquid may be used to help maintain the rate of solvation. Means of cooling the liquid mixture by cooling water coils, Peltier effect device or by immersing the evaporator of a conventional refrigerating unit may be used to remove the heats of mixing and of condensation, to maintain or lower the solution's temperature and sustain the process of solvation. The gas stored in solvation may now be transported at lower pressures than those required for transporting liquified gas.

To capture the common CFC's and CHFC's such as R11, R12, R22 and various azeotropic mixtures, many classes of solvents are available. By way of example, and without limitation to other acceptable classes of solvents, such classes include: halogenated hydrocarbons (such as 1,1,1-trichloroethane or pentachloroethane); fatty acids (such as oleic acid); functionalized vegetable oils (such as amine functionalized castor oils); carbonyl compounds (such as 2-octanone); esters (such as triacetin); glycol ethers (such as diethylene glycol dibutyl ether and tetraethylene glycol diethyl ether), and amides (such as dimethyl formamide). Generally, these solvents are characterized in part by their strong dipole moments, and their attraction for gases is the result of Van der Waals' forces: hydrogen bonding, dipole-dipole, dipole-induced dipole and induced dipole-induced dipole attractions. Seals, gaskets and O-rings of different materials may be required for use with different solvents, but these are all readily available.

The liquified refrigerant-solvent solution may be passed through filter-driers to remove solid particles, water and acids. Additionally, entrained oil in the incoming refrigerant will be trapped in the solvent from which the oil can eventually be removed. Noncondensable gases may be removed from the refrigerant-solvent liquid stream by any of the common methods used to remove noncondensables from condensed refrigerant. In particular, if the solution is cooled, a chamber vertically oriented over the liquid flow and open to it would collect the lighter noncondensables, because of the cooling, with minimum uptake of refrigerant vapor.

To retrieve the refrigerant from solution, the pressure over the solution in the ZVPVT is reduced or the temperature of the solution is increased or both. Gas dissociates itself from the solvent and is vented to another container. The heating means might typically be the coils previously used to carry cooling water now used to carry heating water, or the Peltier effect junction, previously used to cool the solution, now used to heat it by reversing the current flow. The refrigerant is transferred out as a gas and not as a liquid. An off-the-shelf compressor-condenser, equipped with an oil trap if necessary, may be used to liquify the refrigerant for storage and transport.

Further, entrained solvent vapor is removed from the refrigerant vapor stream as it leaves the ZVPVT. To remove vaporized solvent, the exiting refrigerant gas stream is bubbled up through a column of a second solvent with a very low vapor pressure, such as the highly refined vacuum pump oils. The solvent molecules, with their relatively greater dipole moments, will remain in solution in this secondary solvent, from which they can eventually be removed, while the refrigerant molecules are drawn off. The refrigerant will now be pure enough for reuse.

Means for draining and replacing solvents from the apparatus using the present process may also be provided so that the apparatus can be used with other refrigerants. Also, an electrical heating mantle, connected for its power, to the apparatus, may be used to vaporize liquid refrigerant in low places of the unit to be evacuated.

Although the highly volatile gases in terms of which the process of the present invention is described are generally referred to as refrigerants, there are applications other than refrigerant reclamation for which the process is clearly desirable, as well. Metropolitan areas and even states are beginning to require conversion of buses, trucks and other fleet vehicles from gasoline and diesel oil to compressed natural gas (CNG) as fuel. Creating virtually no pollution, CNG-burning vehicles are environmentally desirable in congested areas of heavy vehicular traffic. (Diesel locomotives operating in cities would also be candidates for conversion.) Conversion to CNG appears to be economically feasible, even given the limited capacity and high cost of the very high pressure tanks needed to transport it.

Storage of natural gas dissolved in solvents at much lower pressures than those required to transport, at ambient temperatures, CNG alone would permit use of lighter, cheaper vehicular storage tanks and less robust piping between tank and engine.

Naturally, solvents used would need to be of much lower vapor pressures than the natural gas, and, if not separated from the natural gas prior to combustion, would need to be environmentally benign when consumed, at least in the trace amounts in which this might occur.

Still another application of the process lies in tanker truck or rail tank car transport of natural gas from wells which, by virtue of low output, low pressure or remoteness, cannot economically be connected to gas gathering pipeline networks.

In short, while the description of the present invention uses the terminology of refrigerant gases, it should be remembered that methane, ethane, propane and other constituents of natural gas are commonly used refrigerants.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1:
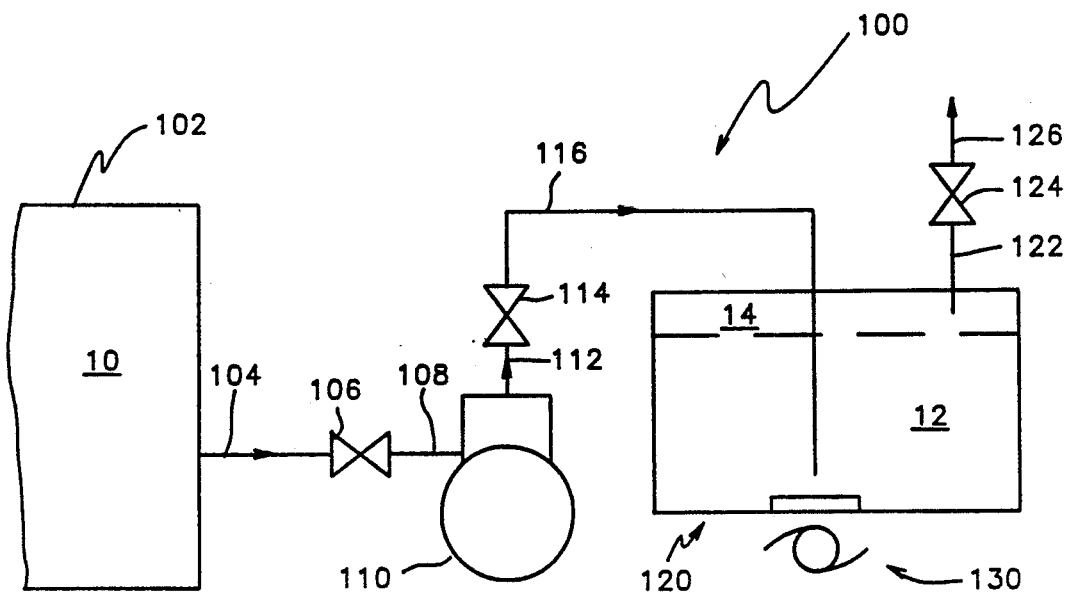
FIG. 1 illustrates a preferred embodiment of the apparatus required to implement the process of the present invention when solvation and dissolution are controlled by change of pressure (using a means of compression). Also illustrated is an auxiliary magnetically coupled motor driven stirrer.

In FIG. 1, the refrigerant 10 to be evacuated from a container 102 is connected by a conduit 104, a valve 106 and a conduit 108 to a compressor 110. The compressor 110 raises the pressure of the refrigerant vapor 10. The compressed refrigerant vapor is conveyed by a conduit 112 and a valve 114 to the reactor or zone of variable pressure and variable temperature (ZVPVT) 120. The ZVPVT 120 contains the liquid refrigerant-solvent solution 12 under an atmosphere of refrigerant vapor 14. During the introduction of compressed vapor, the valve 124, between two conduits 122, 126, is closed. A magnetically coupled motor driven stirrer 130 helps maintain the rate of solution as the solvent becomes more refrigerant laden.

To remove the refrigerant from solution, the valve 114 connected to the compressor 110 by the conduit 112 is closed, and the valve 124 is opened to a region of lower pressure, causing the refrigerant in solution to dissociate from the liquid solvent and to flow through 124 to the region of lower pressure.

Figure 2:
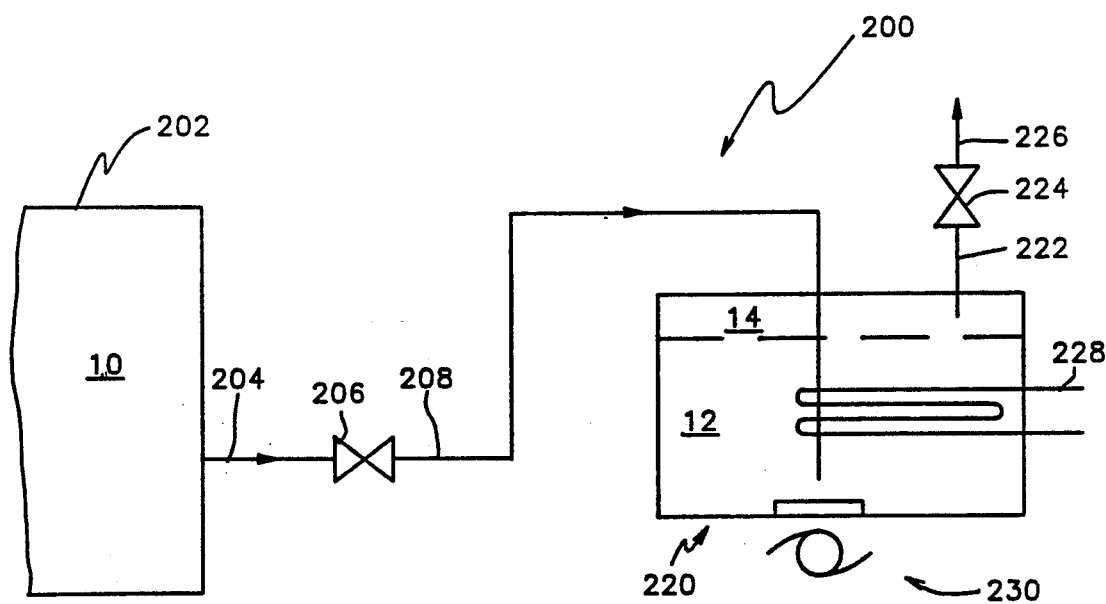
FIG. 2 illustrates a preferred embodiment of the apparatus required to drive the process when solvation and dissolution are controlled by change of temperature (using a means of heating and cooling).

In FIG. 2, the refrigerant 10 to be evacuated from a container 202 is connected by a conduit 204, a valve 206 and a conduit 208 to the ZVPVT 220. The ZVPVT 220 is at a lower pressure because the refrigerant-solvent solution 12 is being cooled by a cooling-heating means 228 causing a reduction in the pressure of the refrigerant vapor 14 over the solution 12. As previously discussed, the valve 224, between two conduits 222, 226, is closed. Again, a magnetically coupled motor driven stirrer 230 maintains the rate of solution as the solvent becomes more refrigerant laden.

To remove the refrigerant from solution, the valve 206 connected to the ZVPVT 220 by the conduit 208 is closed, and the valve 224 is opened to a region of lower pressure, causing the refrigerant in solution to dissociate from the liquid solvent and to flow through 226 to a second region of initially equal or lesser pressure. Heating the solution 12, by the heating/cooling means 228, causes the refrigerant in solution to dissociate from the liquid solvent, raises the pressure of the vapor 14 and causes refrigerant vapor to flow from the ZVPVT 220 through 224 to the second region.

Figure 3:
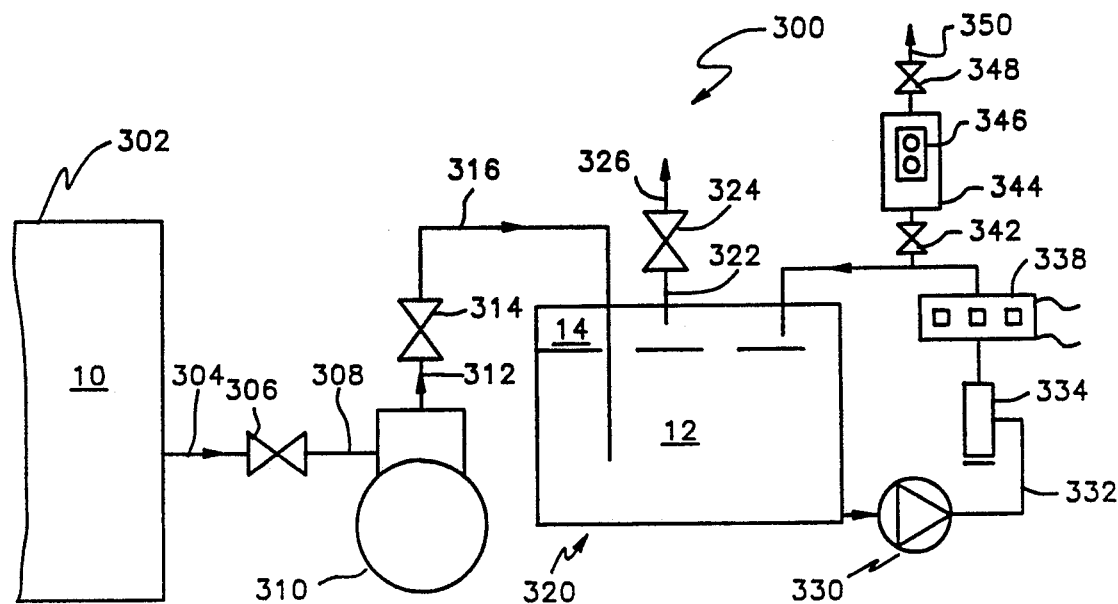
FIG. 3 illustrates an embodiment of the invention in which both means of compression/decompression and of heating/cooling are utilized. Also illustrated is a noncondensable gas trap and purge valve.

In FIG. 3, the refrigerant 10 to be evacuated from a container 302 is connected by a conduit 304, a valve 306 and a conduit 308 to a compressor 310. As before, the valve 324 is closed. Compressed vapor is conveyed via conduit 312, valve 314 and conduit 316 to the ZVPVT 320 where by virtue of the increased pressure of the vapor 14, refrigerant is dissolved into the solution 12.

Additionally, the solution 12 is conveyed through a pump 330, which may be of any positive displacement type, through a filter-drier 334 and a heating/cooling means 338, which may be a Peltier effect thermacooler, or the like, which either cools or heats depending upon the direction of the direct current flow through its junction. Fitted over the conduit from the heating/cooling means 338 back to the ZVPVT 320, and open to the flow of liquid, is a noncondensable gas trap 344 with a shut-off valve 342. A sight glass 346 indicates the presence or absence of noncondensable gases and a purge valve 348 and a conduit 350 permit their removal from the apparatus 300. The cooled solution from cooler/heater 338 is reintroduced into the ZVPVT 320, where by virtue of its reduced temperature, it absorbs more refrigerant. In this embodiment, both the effects of compression and cooling increase the amount of refrigerant dissolved in the solvent.

To extract the refrigerant from the solution 12, the valve 314 is closed and the valve 324 is opened to a second region of lower pressure via a conduit 326. Additionally, the cooler/heater 338 is now caused to heat the solution 12. The combination of reduced pressure in the region on the other side of the valve 324 and increased temperature of solution 12 causes refrigerant vapor 14 to dissociate from solution 12 and flow through the conduit 322 and the valve 324 to the second region via the conduit 326. The circulating pump 330 provides for the agitation/mixing of refrigerant and solvent that was produced in the apparatus 100 and 200 of FIGS. 1 and 2 by the stirrer device 130, 230.

Figure 4:
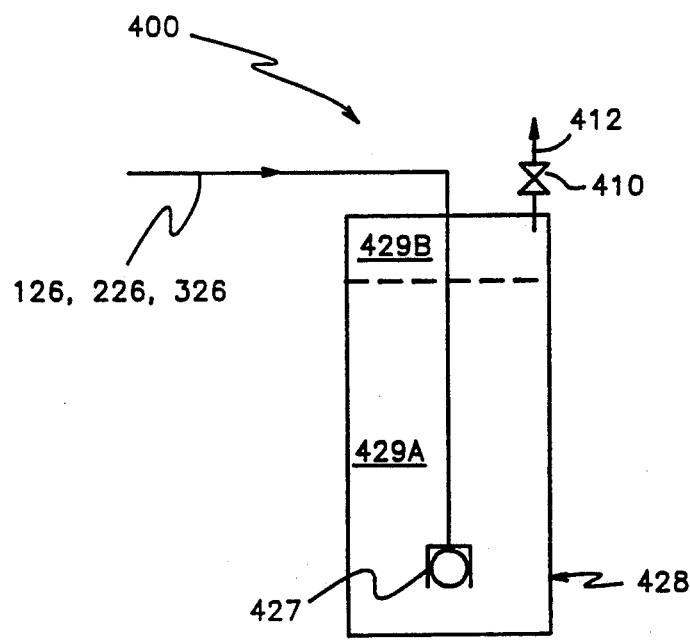
FIG. 4 illustrates a secondary solvent recovery unit in which solvent vapor is removed from reclaimed refrigerant gas.

In FIG. 4, the refrigerant vapor delivered via the respective conduit 126, 226, 326 from the ZVPVT 120, 220, 320 is cleansed of solvent vapor by passing through a check valve 427 (to keep the secondary solvent 429A from backflowing through the conduit 126, 226, 326) into a bubble tube 428 partially filled with a very low vapor pressure solvent 429A, such as for example, vacuum pump oil. Since the molecules of the solvent used in the ZVPVT 120, 220, 320 are much more polar than those of the refrigerant, the solvent molecules in the vapor will be retained in the secondary solvent 429A while, as soon as the solvent 429A is saturated with respect to the refrigerant, the refrigerant molecules will pass through to form vapor 429B which may be vented off as pure refrigerant vapor via the conduit 412 and the valve 410 to a third region.

Figure 5:
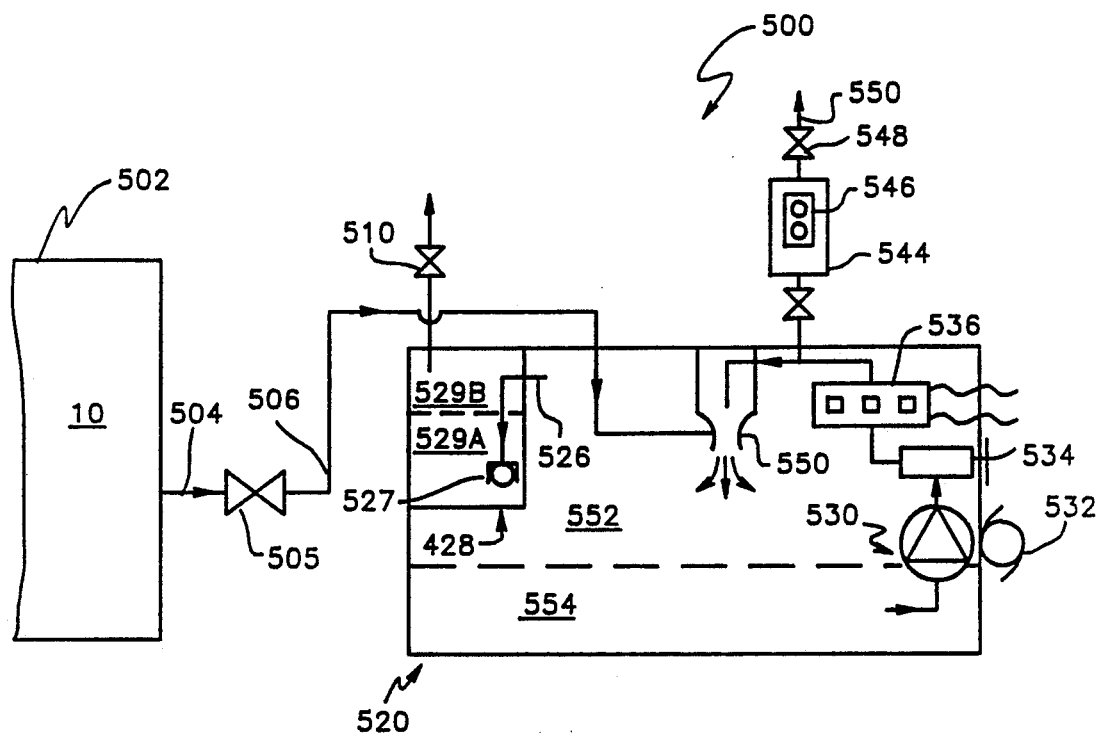
FIG. 5 illustrates a preferred embodiment in which vapor pressure is raised by a jet diffusion pump, the refrigerant-solvent solution is circulated, filtered, either cooled or heated, purged of noncondensable gases and refrigerant vapor is purified by elimination of entrained solvent, which is, with the exception of the noncondensables purging unit, contained in a sealed explosion-proof container.

FIG. 5 displays a design to use the process of the invention combining the features of the devices in FIGS. 3 and 4 in a sealed, explosion-proof shell as the ZVPVT 520. Further, the means of compression 550 is a jet-diffusion pump powered by the liquid pump 530 driven by a magnetically coupled motor 532.

In this embodiment, refrigerant vapor 10 passes from a container 502 to be evacuated, via a conduit 504, a valve 505 and a conduit 506 into the ZVPVT 520 under the pull of jet diffusion pump 550. It passes through vapor space 552 and a portion of the flow combines with the circulating refrigerant-solvent solution expelled from jet diffusion pump 550 to become part of the liquid solution 554. The solution 554 is circulated by pump 530, driven with magnetic coupling through the wall of the ZVPVT 520 by an exterior motor 532. The pumped solution passes through a filter-drier 534 which removes solid particles, water and acids. The pumped solution is then cooled by contact with a heating/cooling means 536, such as for example a Peltier effect junction, which is contained in ZVPVT 520. The cooled solution passes under a noncondensable gases trap assembly 544 which includes a shut-off valve, a sight glass 546 and a purge valve 548.

The pumped solution passes through the jet diffusion pump 550 where it draws refrigerant vapor 10 from the container 502 and combines with some of it to enrich solution 554 which is simultaneously being enriched by the increased pressure of vapor 552 relative to the pressure of the vapor in space 502. Of course, the valve 510 is closed during this process of concentrating refrigerant into solution 554.

To remove the refrigerant to a second region of lower pressure, the valve 505 is closed and the valve 510 is opened. Simultaneously, the heater/cooler 536 is switched to the heating mode. With a Peltier effect junction, this is easily done by reversing the direction of flow of the direct current.

In order to pass to the second region of lower pressure, the vapor 552 must pass through conduit 526, with the check valve 527, into the secondary, or solvent recovery unit 428 and bubble through the second, very low vapor pressure solvent 529A wherein are trapped any molecules of the principal solvent employed in the ZVPVT 520. The pure refrigerant vapor 529B now passes out to the third, receiving region via the valve 510.

Figure 6:
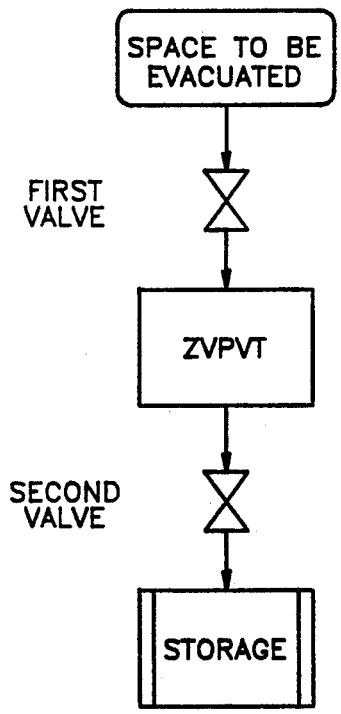
FIG. 6 is a flow diagram illustrating the basic method of the present invention.

FIG. 6 is a flow diagram illustrating the basic method of the present invention. FIG. 6 illustrates a first valve for receiving the refrigerant from the space to be evacuated. The ZVPVT is illustrated for receiving the refrigerant for affecting the appropriate temperature and/or pressure treatment. The affected refrigerant is passed through the second valve to the storage step as vapor or condensed vapor. The steps of the method including: removal of the vapor to be processed from the space to be evacuated to the ZVPVT with the first valve open and the second valve closed; removal of the vapor from the ZVPVT to storage with the first valve closed and the second valve open.

None of the illustrated mechanisms of the process of the invention provide for the transfer of liquid refrigerant from the unit or space to be evacuated into the ZVPVT. However, it will be obvious to anyone skilled in the art how the compressor, if used, can be bypassed as long as liquid refrigerant remains in the evacuated space. Also, as was remarked earlier, liquid refrigerant can be vaporized by the application of a localized heat source. Still further, if the means of compression is a jet diffusion pump, as described in the apparatus of FIG. 5, slugging the intake with liquid refrigerant presents no problem.

Variation of operating equipment, using the processes of the invention, from the apparatus described in FIGS. 1 through 5 will be obvious to those skilled in the relevant arts. Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method of capturing a volatile gas comprising the steps of releasing the gas into a zone of variable pressure and variable temperature containing a liquid quantity of polar chemical solvent which exhibits a negative deviation from Raoult's Law with respect to the gas which is to be captured;

dissolving the gas in the solvent to form a solution by pressurizing and cooling the zone;

isolating the gas and solvent solution within the zone;

dissociating the gas from the solution by heating and depressurizing the zone; and venting and capturing the gas thus dissociated from the solution.

* * * * *